Oct. 16, 1951     D. SARNOFF     2,571,386
EARLY WARNING RELAY SYSTEM
Filed Sept. 16, 1949                                   6 Sheets-Sheet 1

INVENTOR
*David Sarnoff*
BY
ATTORNEY

Fig. 3

Oct. 16, 1951  D. SARNOFF  2,571,386
EARLY WARNING RELAY SYSTEM
Filed Sept. 16, 1949  6 Sheets-Sheet 3

Fig. 4a

| | f | CENTRAL COMMAND POST | SHORE STATION A | POSITION 1 PLANE B | POSITION 2 PLANE C | POSITION 3 PLANE D | POSITION 4 PLANE E | POSITION 5 PLANE F |
|---|---|---|---|---|---|---|---|---|
| RADAR BAND | 10,600 MC | | | | | ⇐⇒ | | |
| | 10,400 MC | | | | ⇐⇒ | | | ⇐⇒ |
| | 10,200 MC | | | ⇐⇒ | | | ⇐⇒ | |
| | 10,000 MC | | ⇐⇒ | | | | | |
| RELAY BAND | 7,000 MC | | | (⇐ | +1200 KC ⇒)(⇐ | ⇒) | +2000 KC ⇒)(⇐ | ⇒) |
| | 6,800 MC | | | (⇐ | ←)(→ | ⇒)(⇐ | ←)(→ | ⇒) |
| | 6,600 MC | (→ | ⇒)(⇐ | +800 KC | ⇒)(⇐ | +1600 KC | ⇒)(⇐ | +2400 KC |
| | 6,400 MC | (→ | ⇒)(⇐ | ←)(→ | ⇒)(⇐ | ←)(→ | ⇒)(⇐ | ←)(→ |
| | 6,200 MC | (⇐ | +400 KC ⇒) | ⇒) | | | | |
| | 6,000 MC | (⇐ | ←)(→ | ⇒) | | | | |
| SERVICE BAND | 302 MC | | | ⇐ | ↔ | ⇒ | ⇐ | ↔ |
| | 301 MC | | ⇐ | ↔ | ⇒ | | ⇐ | ⇒ |
| | 300 MC | | ↔ | ⇒ | ⇐ | ↔ | ⇒ | ⇐ |

Fig. 4b

| | f | CENTRAL COMMAND POST | SHORE STATION A | POSITION 1 PLANE MM | POSITION 2 PLANE B | POSITION 3 PLANE C | POSITION 4 PLANE D | POSITION 5 PLANE E |
|---|---|---|---|---|---|---|---|---|
| RADAR BAND | 10,600 MC | | | ⇐⇒ | | | ⇐⇒ | |
| | 10,400 MC | | | | | ⇐⇒ | | |
| | 10,200 MC | | | | ⇐⇒ | | | ⇐⇒ |
| | 10,000 MC | | ⇐⇒ | | | | | |
| RELAY BAND | 7,000 MC | | | (⇐ | +6000 KC ⇒)(⇐ | +1200 KC ⇒)(⇐ | | +2000 KC |
| | 6,800 MC | | | (⇐ | ←)(→ | ⇒)(⇐ | ←)(→ | ⇒)(⇐ | ←)(→ |
| | 6,600 MC | (→ | ⇒ | | (⇐ | +800 KC ⇒)(⇐ | +1600 KC ⇒)(⇐ |
| | 6,400 MC | (→ | ⇒) | | (⇐ | ←)(→ | ⇒)(⇐ | ← → | ⇒)(⇐ |
| | 6,200 MC | (⇐ | +400 KC ⇒) | | | | | |
| | 6,000 MC | (⇐ | ←)(→ | ⇒) | | | | |
| SERVICE BAND | 302 MC | | ↔ | ⇒ | | ⇐ | ↔ | ⇒ | ⇐ |
| | 301 MC | | | ⇐ | ↔ | ⇒ | ⇐ | ↔ |
| | 300 MC | | ⇐ | ↔ | ⇒ | ⇐ | ↔ | ⇒ |

THROUGHOUT—
  BLACK ARROWS INDICATE TRANSMISSION
  WHITE ARROWS INDICATE RECEPTION
  DOTTED ARROWS INDICATE REFLECTION RECEPTION
IN RELAY BAND—
  OPEN-V ARROWS INDICATE THROUGH CARRIER
  CLOSED-V ARROWS INDICATE LOCAL CARRIER

INVENTOR
David Sarnoff
BY
ATTORNEY

Oct. 16, 1951          D. SARNOFF          2,571,386
EARLY WARNING RELAY SYSTEM
Filed Sept. 16, 1949          6 Sheets-Sheet 5

INVENTOR
David Sarnoff
BY
ATTORNEY

Patented Oct. 16, 1951

2,571,386

UNITED STATES PATENT OFFICE 2,571,386

EARLY WARNING RELAY SYSTEM

David Sarnoff, New York, N. Y., assignor to Radio Corporation of America, a corporation of Delaware Application September 16, 1949, Serial No. 116,130

2 Claims. (Cl. 343—6)

This invention provides method and means for surveillance of a string of areas off-shore or remote from the borders of a country for detection of planes, guided missiles, enemy vessels, or other targets in those areas, and for instantaneous communication of running target positions to a central intelligence station or command post within the country.

The invention further provides a method and means for dispatching fighter aircraft and directing them to the enemy planes, guided missiles or the like that have been detected.

It further provides available opportunity and means for early interception of report and control signals sent from and to a guided missile, and the radiating of identical signals for jamming of the channel or counter-controlling of the missile.

The invention further provides, in an extended chain of positions, for the obtaining of detection information at each position and the transmittal of that information along with the relaying of information received from the preceding position, whereby the central station will constantly receive a stream of detection information covering the segments of a band or chain stretching for thousands of miles if desired over land or water in a straight line, a loop, or other desired configuration.

A particular embodiment of my invention combines the detection coverage and relaying thereof with a purely relaying system between two remote shore stations as disclosed in United States patent application Serial No. 103,342 of Clarence W. Hansell and Donald S. Bond, filed July 7, 1949.

A country may be subjected to sudden attack from the air by bomber flights or by long-range guided missiles. The warhead not only may consist of high explosives but may consist of an atomic bomb or other weapon capable of widespread area effects. The vehicle may travel at from two or three hundred miles an hour to 3600 M. P. H. or more.

Shore-based ground control intercept networks reach out only about two or three hundred miles with radar detection, and leave little time and space for the countering of such attacks. High speed guided missiles may travel this distance in about five minutes. Considering the time required for detection, tracking, identification or decision to counter, command, plotting of relative trajectories, execution, and time of flight of countering missile, the warning time provided by shore-based radar alone may be crucially insufficient for meeting either a high speed missile or a bomber attack carrying area-effect weapons. Especially is this true with high speed missiles carrying area-effect warheads.

An object of this invention is to enable detection and instantaneous forwarding of the detection information at much greater distances whereby greater time for counter-measures will be afforded and opportunity will be given for disposition of the missile remotely over the sea where even very extensive area effects will be dissipated and comparatively harmless.

A further object of this invention is to provide an improved radar fence which has a comparatively great depth of protective area.

Further objects of the invention comprise the inclusion of relative target position signals and absolute detection station position signals, and other local information as desired, from each moving station link in a radio relay chain whereby in each station relays received information while automatically and continuously adding information originating within it.

The invention, according to one embodiment, comprises a line of aircraft flying at spaced intervals, each radiating a beacon signal in all horizontal directions in a relatively low-frequency service band, receiving similar beacon signals from adjacent aircraft by "lock-on" or self-orienting direction-finder receivers, the direction finders automatically orienting other antennas for a beamed communication channel in a relatively high-frequency communication band so that these antennas are kept pointed toward the adjacent aircraft, whereby a continuous line of relay transmission contact is kept established, while additional locally originated information such as from radar stations is also fed into the relay line from each of the aircraft in the chain.

A preferred embodiment also includes a system whereby fighter aircraft can reach the enemy bomber, missile or other target quickly to destroy it or to divert its course. Such a system includes the use of a parasite airplane carried by each of the large aircraft equipped with the early warning radar apparatus. When an enemy target is detected, the parasite airplane is launched and it is flown toward the target. The parasite airplane carries suitable radar and radio equipment so that it may transmit target position information and the like to the nearest group of fighter planes which may be either land based or carrier based. This feature of the invention is described in more detail under the heading "Use of Parasite Planes and Fighter Aircraft to Increase Depth of Defense."

Drawings

To illustrate the principle of the invention, I have shown alternative forms of the preferred embodiment in the drawings, wherein.

Description

In accordance with my invention a continuous series of planes is dispatched at equal intervals over a predetermined flight path, each serves as a relay link to maintain communication between the stations at the ends of the line, and each generates, and relays on, both passive (panoramic receiver) and active (radar) detection information covering the area about it.

Figures 1, 2, 2A, 2B:
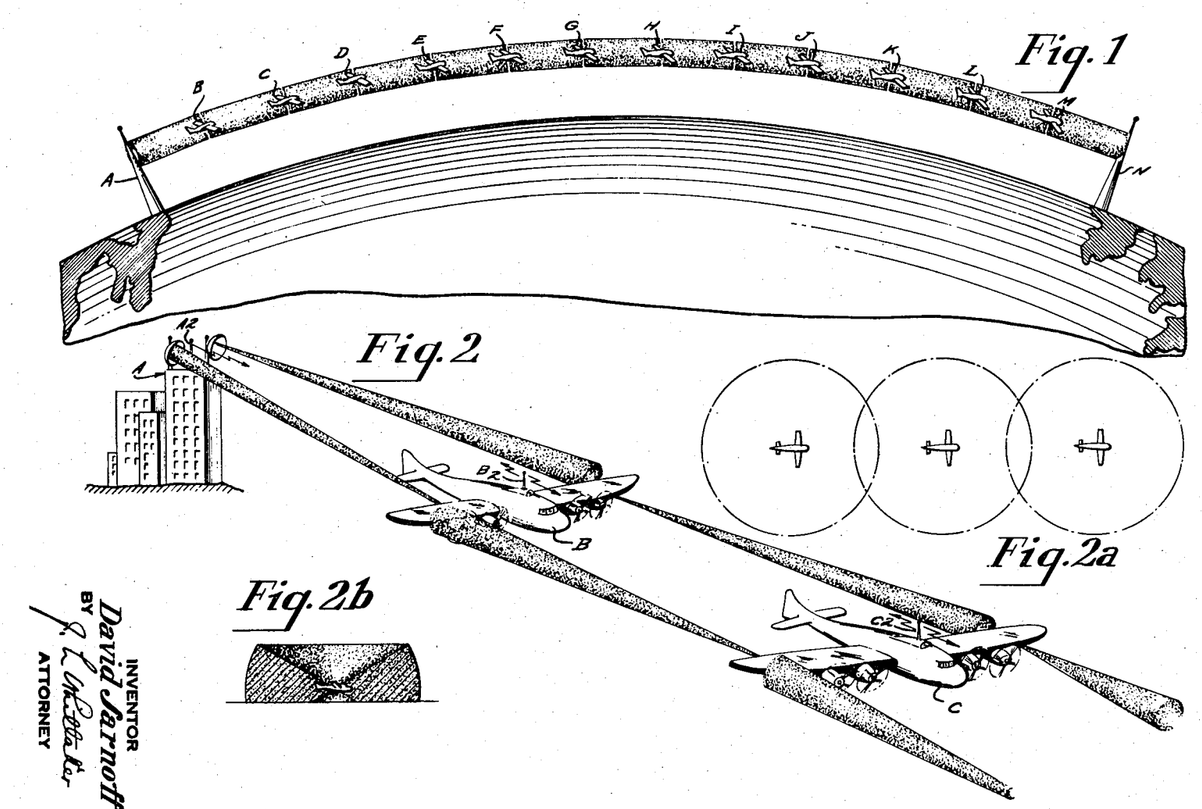
Figure 1 is a diagrammatic elevation of an air relay and detection system in accordance with my invention.
Figure 2 is a diagrammatic perspective view of the communication radiation patterns, a shore station and two aircraft of the system being shown.
Figure 2a is a diagrammatic plan view of the detection coverage of the several airplanes.
Figure 2b is a diagrammatic sectional view of the detection coverage of a typical plane.

In Figure 1 the spacing and linking of the airborne relay stations are illustrated in a diagrammatic manner. A near shore station A stands on a promontory on the north-western shore of the Atlantic, as for example in Newfoundland, while a far short station N stands on a promontory on the north-eastern shore, as for example in the United Kingdom. A suitable number of aircraft B, C, D, E, F, G, H, I, J, K, L, and M are in flight at equal intervals from A to N. Tower relays may extend the chain on shore, as for example to a central command station in Washington.

In actual practice the order of magnitude of the spacing may be 250 miles, the altitude about 20 thousand feet, and the speed about 250 m. p. h. Accordingly, at intervals at about an hour a plane will land in the vicinity of the far shore station and another will be dispatched from the vicinity of the near shore station. A similar stream of planes will return in continuous spaced flight, preferably by a somewhat different route.

The scale of Figure 1 cannot well illustrate the propagation paths. The desired relation between altitude and spacing will be such that the line-of-sight between successive aircraft will be well above grazing incidence at the surface midway between them, in order to avoid compounding the difficult propagation problem. Since the spacing should be maximized in order to minimize the number of aircraft required to be airborne, the flight altitude should be as great as feasible. Employment of planes capable of long endurance at great altitudes and relatively low speeds will tend to minimize the cost of operating the system.

Figure 3:
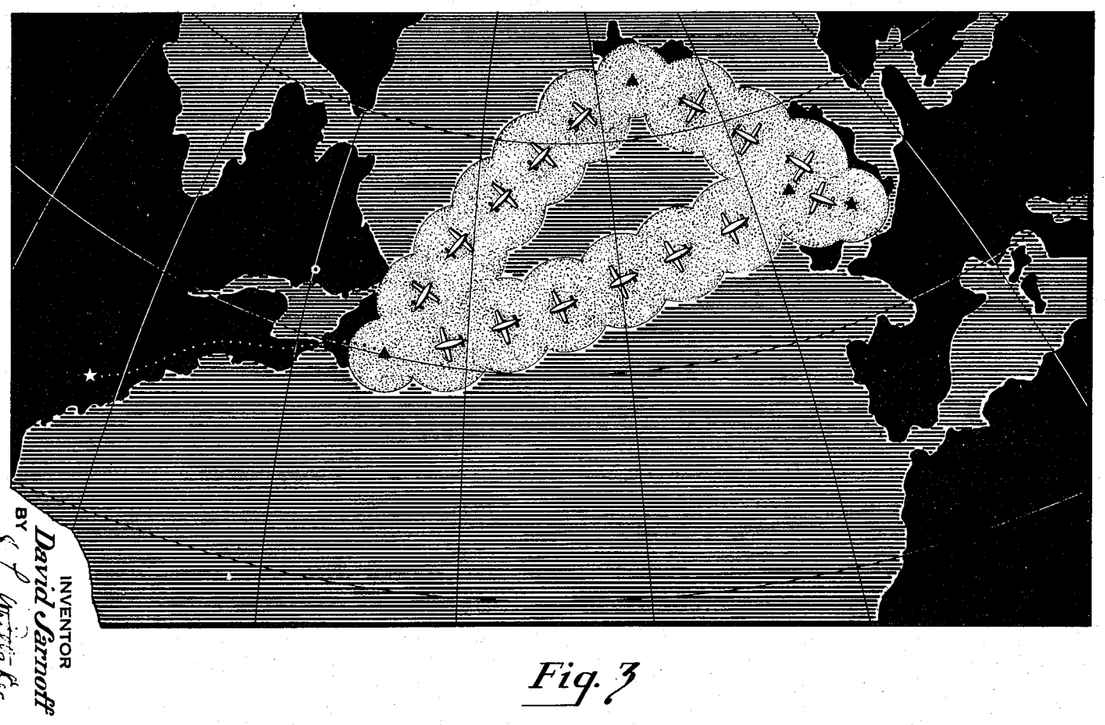
Figure 3 is a geographic view of a line of aircraft constituting a relay chain, with the return flights following a different path, the detection areas thus swept out being indicated by shading.

For illustration of a flight path which might be selected, in Figure 3 I have shown the flights as proceeding from Newfoundland to Iceland, from there to the vicinity of London, and from there returning via North Ireland to Newfoundland. It will be understood that at any given time the flight path selected will be a function of several variables, including aircraft performance, weather, availability of ground stations for such use, and relative importance of various areas for detection coverage. Also as wind and weather change, or defense circumstances dictate, the route may be altered during flight, either gradually or with a temporary break in communication to be healed on achievement of the new flight configuration. Due to the two-way communication system, breaks in one leg at a time will not interrupt the complete flow of communication.

Each plane in the system is equipped with radar. Assuming a coverage radius of 200 miles, the shaded paths in Figure 3, made up of overlapping circular areas about the several planes, are illustrative of the swept area. In Figures 2a and 2b there is illustrated diagrammatically the radar coverage of representative planes in the system. The coverage may desirably be 360° in the horizontal and from about 45° elevation to about 45° depression.

Equipment and operation

The equipment and system of operation will now be described in general terms. Essentially the several aircraft maintain relay linkage by a beacon transmitter and two direction-finder receivers on each plane, one direction finder pointing to the next plane West and the other pointing to the next plane East. Each of these direction finders, through a servo, causes a pair of antennas for transmitting and receiving to point to the next plane, one pair being pointed ahead (or East) and one being pointed back (or West). These antennas carry the relayed message. In any plane the incoming message is picked up by the receiving antenna of one pair, and retransmitted from the transmitting antenna of the pair pointing in the other direction. Each plane also feeds locally derived detection information into the relayed signal stream. This detection information will be both active and passive, namely from the plane's search radar and from a panoramic receiver. The detection information may also be derived from infra-red detectors. The detection information may be transmitted to the shore terminal and thence to the central command station, being fed into the relayed signal stream, for later separation either by frequency differentiation or by time multiplexing.

Figure 4A:
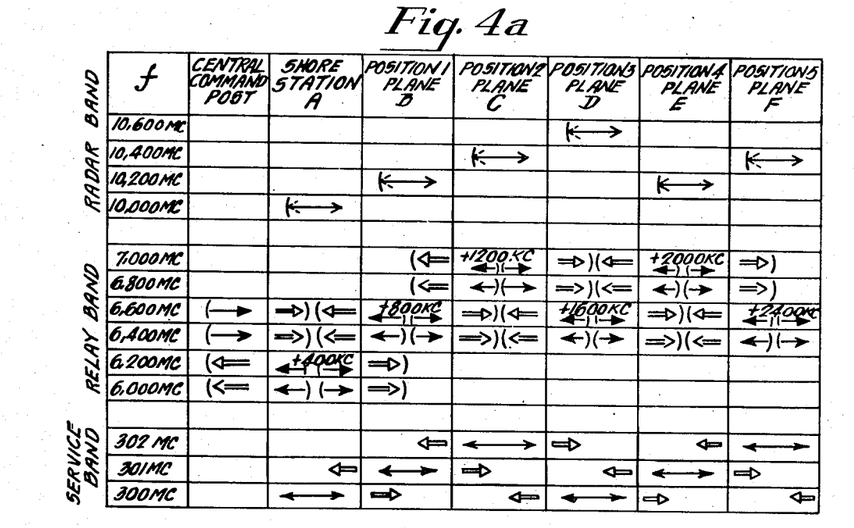
Figures 4a and 4b are diagrammatic representations of the frequencies employed, Figure 4a showing the situation at one time and Figure 4b showing the situation an hour later when another plane has taken off and been added into the near end of the relay chain.
Figure 4B:
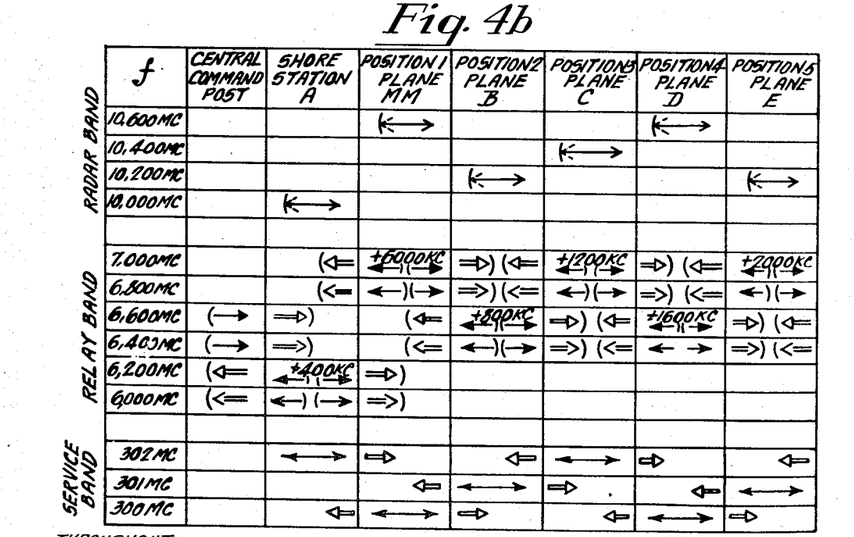

In order to avoid interference and ambiguities the system employs three frequency bands for service, relay and radar respectively, with furthere channel separation within those bands. Taking aircraft B as illustrative, its two direction finders can be made to discriminate East and West by suitable geometry or shielding if desired. However, aircraft B's own beacon transmitter would interfere if on the same frequency. Also, it is preferred that the direction finders be arranged to search through 360 degrees. Therefore, three service band transmitting frequencies $F_1$, $F_2$ and $F_3$ on adjacent aircraft are employed. Any other plane on the frequency being received is too remote to cause ambiguity. As illustrated in Figures 4a and 4b, the frequencies $F_1$, $F_2$ and $F_3$ may be 300 megacycles, 301 mc. and 302 mc., respectively. In those figures black arrows indicate transmission and white arrows indicate reception.

Figure 4a illustrates the condition where plane B has just departed from shore station A. Figure 4b illustrates the condition one hour later where plane B is one hour away from shore station A and a plane MM has just departed from shore station A. It will be evident that the beacon and the direction finder at shore station A must be tuned or switched to operate at different frequencies each time a plane departs. Comparing Figures 4a and 4b it will be seen that in Figure 4a the beacon at the shore station is shown transmitting on 300 megacycles whereas in Figure 4b it is shown transmitting on 302 megacycles. In Figure 4a the direction finder at the shore station is tuned to 301 megacycles, the transmitting frequency of the beacon on plane B whereas in Figure 4b the direction finder of the shore station A is shown tuned to 300 megacycles, the beacon transmitting frequency of the plane MM.

For signals in the relay band a higher frequency will be used, such as to give a narrow beam, and hence long range with low power, within antenna dimensions appropriate to airborne equipment. Alternate planes are assigned one channel, intermediate planes another, and the shore stations a third. For reasons appearing later, one form of my invention employs two carriers in each direction, necessitating double channels. These channels may for example be 6000 and 6200 megacycles, 6400 and 6600 mc., and 6800 and 7000 mc.

The radar equipments of the planes are preferably assigned three different frequencies for successive planes, and a fourth for the shore stations, since in the case of the radar signals distance of travel of signal out to a target and back to the plane must be compared with distance from possibly interfering transmitters so the distance to the next transmitter on the same frequency must be greater than in the case of plane-to-plane communication.

*Specific form*

The equipment for the various elements of the system will now be described specifically, with particular reference to Figure 5 of the drawings. A specific embodiment is described and shown, as illustrative of the principles of the invention.

At shore station A a beacon transmitter A1 radiates, from non-directive antenna A2, a horizontally omnidirectional beacon signal at the frequency $F_1$ of 300 megacycles. A direction finder A4 picks up the beacon signal radiated from the nearest plane, which, in the example shown, is of frequency $F_2$ or 301 megacycles. The direction finder is preferably of the self-orienting or automatic lock-on type. A servo mechanism A5 drives antennas A6e and A7e together to point always toward the source of the beacon signal received by the direction finder. For vertical control of the antenna the direction finder may include duplicate sensing means as to vertical angle, or gyro stabilization may be provided. Transmitters A8 and A9 are associated respectively with antennas A6e and A7e. Antennas A6e and A7e are of the narrow beam type such as parabolic reflectors, having transmission and acceptance solid angles of in the neighborhood of 2°. In some forms of the system a single antenna may serve for both transmitting and receiving.

At aircraft B a beacon transmitter B1 radiates, from non-directive antenna B2, a beacon signal at the frequency $F_2$ of 301 megacycles. Direction finder B4w receives and directionally locks onto the beacon signal of frequency $F_1$ from shore station A. Servo B5w automatically and continuously orients antennas B6w and B7w to the direction of shore station A, and later to the direction of the next plane in succession. Transmitter B8w associated with antenna B6w transmits signals on 6400 and 6600 mc. which are received at antenna A7e. Receiver B9w receives signals at 6000 and 6200 mc. transmitted from antenna A6e. The 6000 and 6200 mc. signal received at B9w is, with frequency conversion to 6400 and 6600 mc., retransmitted East by transmitter B8e, while one source of the signal retransmitted West on 6400 and 6600 mc. is the 6800 and 7000 mc. signal received by receiver B9e through antenna B7e.

Antennas B6e and B7e are continuously and automatically kept pointed at aircraft C by servo B5e following lock-on direction finder B4e which is receiving beacon signals of frequency $F_3$ from beacon transmitter C1 and antenna C2 of aircraft C. Aircraft C is similarly provided with direction finders C4w and C4e, servos C5w and C5e, transmitters C8w and C8e, receivers C9w and C9e and antennas C6w, C6e, C7w and C7e. The operation of the equipment at aircraft C and at successive aircraft in the series is the same as that at aircraft B. Shore station N operates similarly to shore station A. In the case of the shore stations, Figure 4 illustrates the arrangement for two-way communication over a single line of aircraft, and it will be realized that for a closed loop between two terminals, as illustrated in Figure 3 for example, the shore stations will be provided with dual equipment similar to that on the aircraft so as to both send and receive along both the incoming flight line and the outgoing flight line. Moreover, shore station A may be equipped with further duplicate equipment to relay the signals on by a line of shore towers or by coaxial cable to a central command post illustrated in Figure 3 as being located in Washington.

It was mentioned above that one source of the signal stream transmitted west by aircraft B (and similarly by the other aircraft of the system) is the signals received from the preceding aircraft in the line. The present invention provides for the inclusion of additional signals to the relayed stream, these added signals conveying local detection intelligence. While a variety of sources may be used for the derivation of this intelligence, such as visual look-out, infra-red detectors, etc., I have illustrated two representative forms. For active detection I have shown radar transmitter 10 (with letter prefixes for aircraft B and C throughout) and receiver 11, with diplexer 12, antenna 13, scanner drive 14, timing deflection circuits 15 and display 16.

Figure 5:
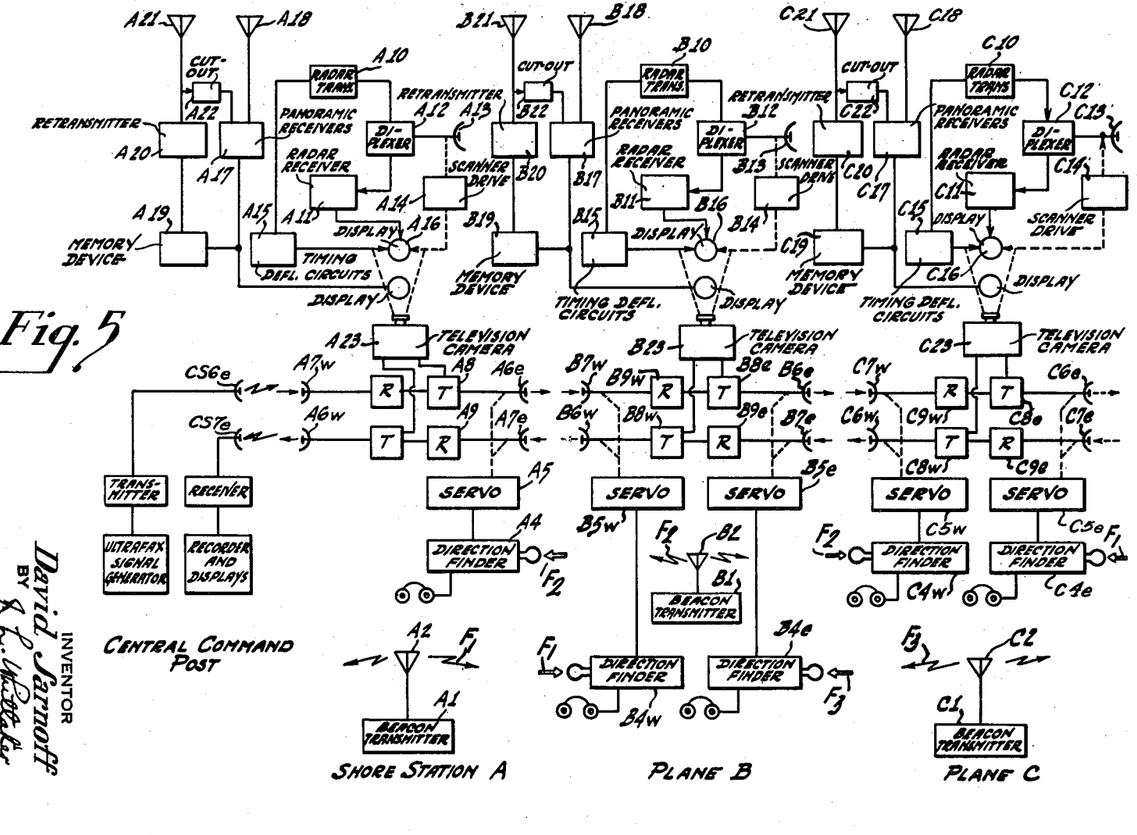
Figure 5 is a block diagram of the equipment provided.

For passive detection I have shown in Figure 5 a group of panoramic receivers B17 with antenna B18, a storage tube, recorder, or other memory device B19, and associated therewith a retransmitter B20 with antenna B21. A cut-out B22 protects the panoramic receivers when transmitter B20 is sending. The panoramic receivers will be also protected by suitable means from other signals radiated from the plane carrying it or by other planes in the relay chain. The purpose of the memory device and retransmitter will be discussed later herein.

Figures 6, 9:
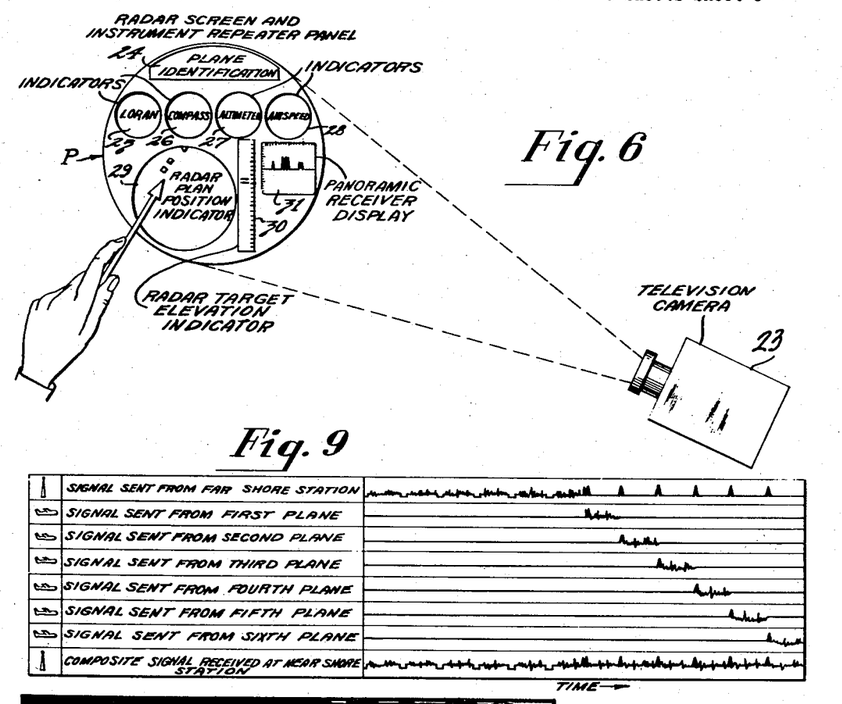
Figure 6 is a diagrammatic view of representative radar, flight, and other instrument presentations as relayed from each plane.
Figure 9 is a diagrammatic showing of an alternative arrangement utilizing time multiplexing rather than frequency separation for common transmission of separable communication components.

Each plane in the relay line will add, to the signals it relays, signals giving local detection information. This may be done in a variety of ways. I have illustrated a method consisting of televising an instrument display panel P. Referring to Figure 6 in conjunction with Figure 5, a television camera 23 views a panel P of instruments or repeaters providing such information as it is desired to send on. This may desirably include visible identification 24 of the particular plane, and flight instruments such as Loran indicator 25, compass indicator 26, altimeter indicator 27 and airspeed indicator 28. In addition a radar plan position indicator display 29 is provided. A target height indicator 30 may desirably be provided, for example, based on the teachings of Lyman Patent No. 2,231,929 listed hereinafter. A suitable display 31 for the panoramic receivers may be provided, the one shown having a horizontal frequency scale and a vertical amplitude scale. With this system a hand pointer may be used, to call the attention of central command post personnel to important indications.

The information derived locally at the plane may be added into the signals received and relayed on by it in any manner permitting of separation at the shore station or the central command station. I have illustrated two alternative methods of accomplishing this. One is by frequency distinction, and another is by time separation or multiplexing.

*Frequency distinction form*

Figure 7:
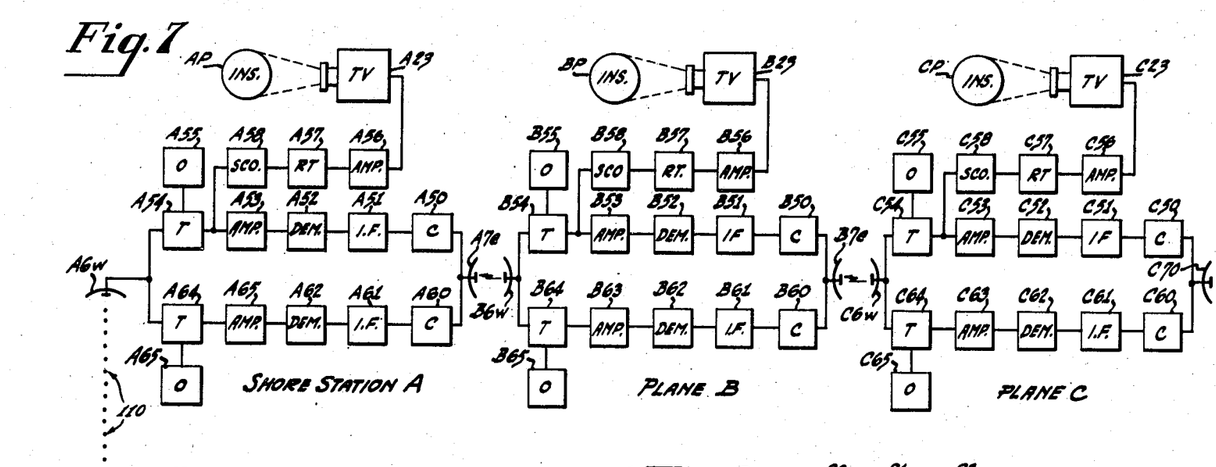
Figure 7 is a block diagram of a frequency separation arrangement for relaying received information and adding locally generated information at each relay station.
Figure 8:
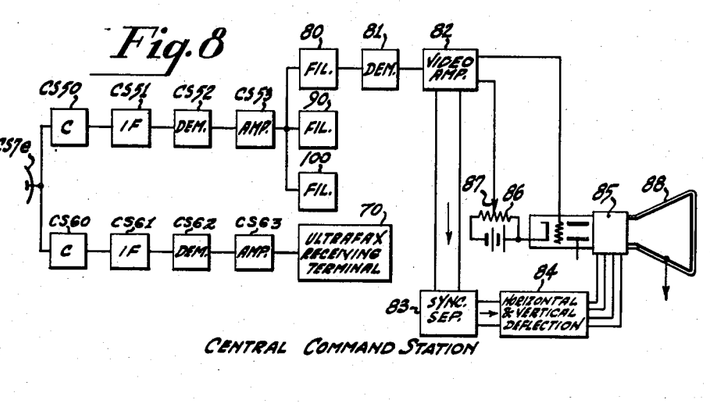
Figure 8 is a block diagram of an accompanying arrangement for a terminal receiving station.

Figures 7 and 8 illustrate combining of later-separable signals by frequency distinction. Two of the planes, a shore station, and the central command station, are shown to illustrate the system. Only the facilities for communication east-to-west are detailed in these two figures, but it will be understood particularly from reference to Figure 5 that provision of additional similar equipment for two-way communication is preferred, for transmission on one shore-to-shore signal on to the east, another on to the west, and the additive transmission both ways of locally generated early-warning intelligence.

Plane C has information from radar and other locally-carried instruments presented on instrument display panel P. Television camera C23 converts the instrument display to a video signal, together with the usual synchronizing pulses. This signal output is amplified by amplifier C56 and applied to suitable means such as reactance tube C57 to frequency modulate subcarrier oscillator C58 operating, in this instance, at 1200 kc. The frequency-modulated 1200 kc. subcarrier is applied to the radio relay transmitter C54 which includes an oscillator C55 which, in this instance, operates at the local carrier frequency of 7000 mc. The frequency-modulated subcarrier in this illustration amplitude-modulates the main carrier. It will be undsrtood that there is some freedom of choice in the selections of types of modulations to be employed at each point, the choice depending largely on propagation characteristics in practice.

Beamed and relayed from one end of the system to the other are two carriers, one a "local carrier" for picking up and carrying on information originated and added locally by the several planes, and the other a "through carrier" for carrying the trans-Atlantic shore-to-shore communication consisting of an "Ultrafax" transmission, a high resolution television program, or other desired intelligence.

These two carriers are at high frequencies spaced apart sufficiently to be completely separable at the end receiver, but close enough to operate successfully through the same antenna system. In Figures 4a and 4b the local carriers are represented by arrows with closed heads, and the through carriers by arrows with open heads.

Both carriers are received at plane C by its antenna C7e and fed to two selective receiving systems which together constitute the receiver C9e of Figure 5. The received through carrier in the illustration is at 6400 megacycles and the received local carrier is at 6600 mc. Referring once again to Figure 7, it is seen that the 6400 mc. carrier is fed into a receiving system tuned to it and comprising a converter C60, an intermediate frequency amplifier C61, a demodulator C62, an amplifier C63, and signals derived from the carrier pass into a transmitter C64 having a 6800 mc. oscillator, from where signal for transmission goes to antenna C8w.

The 6600 mc. local carrier goes from the antenna to a similar receiving system tuned to its frequency and comprising a converter C50, an I.-F. amplifier C51, a demodulator C52, and an amplifier C53. At this point, before going to the 7000 mc. transmitter C54, the signals derived from the carrier are mixed with a signal containing locally derived intelligence which is added in through a subcarrier.

The instrument display panel CP, for particulars of which see Figure 6, is viewed by a television camera C23. Its complete video signal including synchronizing pulses is led to amplifier C56 and then to a frequency-modulating means such as reactance tube C57. From there it goes to subcarrier oscillator C58 which impresses a 1200 kc. oscillation to amplitude modulate the local carrier to which it is fed just before the transmitter C54. As mentioned earlier, other types or combinations of modulation may be employed. Subcarrier band widths will vary with resolution required.

At the point now reached in the description both the through carrier, and the local carrier modulated by the incoming local video signal and by the locally derived subcarrier, are radiated from antenna C8w. These are received at antenna B7e on plane B and are accorded similar treatment by similar equipment denoted by similar reference characters. In this case however, the through carrier and local carrier are received at 6800 mc. and 7000 mc., respectively, and are radiated onward from plane B to shore station A at 6400 mc. and 6600 mc., respectively, the intelligence generated at plane B being superimposed on the local carrier retransmitted at 6600 mc. by a subcarrier of 800 kc.

Various arrangements respecting shore station A and the central command station might be provided. For example, the central command station might receive direct from one of the airborne relay links. In the example shown in the drawings the airborne line is made as short as practicable to conserve plane flight hours, and shore station A is in most respects like the various airborne relay stations and sends on its intelligence, including local intelligence added in by a 400 kc. subcarrier, by relay towers or coaxial cable to the central command station in Washington or other suitable location.

As shown in Figure 7, the equipment of shore station A is like that of the planes in the system, including the generating and supplying of radar detection intelligence with respect to its own fixed location. In Figure 7 the intermediate relay towers between shore station A and central command station are indicated merely by the dots 110.

The relayed signal comes to antenna CS7e at the central command station and is led to receiver CS9e. As seen in Figure 8, this receiver consists of a part tuned to the 6000 mc. through carrier and comprising converter CS60, intermediate frequency amplifier CS61, demodulator CS62 and amplifier CS63 from which the through carrier signal goes to suitable receiving terminal such as "Ultrafax" receiving terminal 70.

The composite signal received at antenna CS7e is also led to a part of the receiver tuned to the 6200 mc. local carrier. This part comprises converter CS50, intermediate-frequency amplifier CS51, demodulator CS52 and broad band amplifier CS53. The various frequency-modulated subcarriers with their intelligence content are now left. These go to a group of narrow band pass filters 80, 90, 100, and as many more as may be needed, of the various frequencies 400 kc., 800 kc., 1200 kc., etc., employed by the several message-generating relay stations, each filter passing a sub-carrier and sending it to its demodulator 81, 91, 101, etc., and from thence to video amplifier 82, 92, 102, etc.

Each video amplifier has associated with it the means for converting the electric signal to a visual presentation. As seen in Figure 8 this may comprise sync separator 83, horizontal and vertical deflection circuits 84, deflecting coils 85, biasing resistor 86 with variable tap 87, and picture tube 88.

The "Ultrafax" signals will be received continuously at the same instrument, namely the "Ultrafax" receiving terminal; the television picture of the instrument display panel of shore station A will be received continuously at the same instrument, namely cathode ray tube 88. With respect to the planes in the relay it is desirable to present their intelligence in a line of picture tubes corresponding generally to the line of planes in the air. Since periodically a plane lands at the far end and another takes off at the near end of the line, the present invention provides a rotary switch S between the video receivers and the picture tubes so that the signal from each plane can by switching be moved on from one picture tube to the next as the plane changes from being the nearest one to being the second nearest, and so on. The rotary switch, which will be moved one step clockwise each time another plane takes off, will have as many pairs of contact points as there are planes in the line, there being that same number of video receivers and picture tubes connected through the switch.

It is to be expected that suitable accessory equipment will be selected or developed. The present information gives at the central command post the absolute position of a plane and the relative position of a target with respect to that plane. From this and other information at hand can be derived the absolute position, height, course and speed of an oncoming missile. In order to accomplish these derivations almost instantly it is expected that computer equipments will be provided together with optimum display systems to facilitate monitoring and command.

Time multiplexing form

In Figure 9, I have illustrated diagrammatically an alternative arrangement for sending a shore-to-shore message and adding later separable intelligence at each plane in the relay system. In this alternative the various messages are distinguished on a time basis rather than a frequency basis. While the time periods could be substantial, with the messages examined one at a time at the receiving terminal, a rapid rate such as to make each signal effectively continuous to the eye is preferred. For this purpose the complete cycle of signals from all the originating sources should occur in not more than about a twenty-fifth of a second, and may be much shorter.

As indicated in Figure 9, one shore station, in this case the far one, sends frames of intelligence with blanking pulses between. After a sufficient number of frames it sends a distinctive keying pulse which automatically triggers off the transmitter in the plane nearest it. After a suitable short period the shore station sends another keying pulse which terminates the transmission from the first plane and initiates transmission from the second plane. The process continues thus until all the planes have transmitted, after which the shore station again sends frames of shore-to-shore intelligence to commence another such cycle. Each plane is equipped with a triggering counter which is activated by the distinctive keying pulse and triggers on and off at the proper number of keying pulses thereafter. The composite signal as received at the near shore station is shown at the bottom line of Figure 9. At the receiving terminal similar triggering counters route the successive parts of the composite signal to individual video displays. Here also successive switching is employed at the receiving terminal. It will be noted with both forms that no changing of transmitter frequency on any plane in flight is required, and that only when near the shore stations do the planes need to change receiver frequencies. The service band may advantageously be used to notify the planes for that change.

Airborne countermeasure device

In Figure 5 there was shown a group of panoramic receivers, a memory device, and a retransmitter. Thus in addition to relaying early warning information each plane in the line can observe enemy signals sent out to control the path of guided missiles, or signals sent back by the missiles to show their position. At the same time they are displayed for visual observation they are stored in a memory device. The monitoring operator can, on observing the signals, throw the memory device to "hold" and can retransmit the same signals from it at will. Alternatively he can set the memory device to transmit duplicate signals through the retransmitter immediately after receipt, either once, a few times, or continuously. Thus under favorable circumstances a guided missile receiving an original order to turn left one degree for example may be given the same order over and over again from one of the planes in the relay system, until it exhausts itself circling.

Alternative routing of planes

Figure 10:
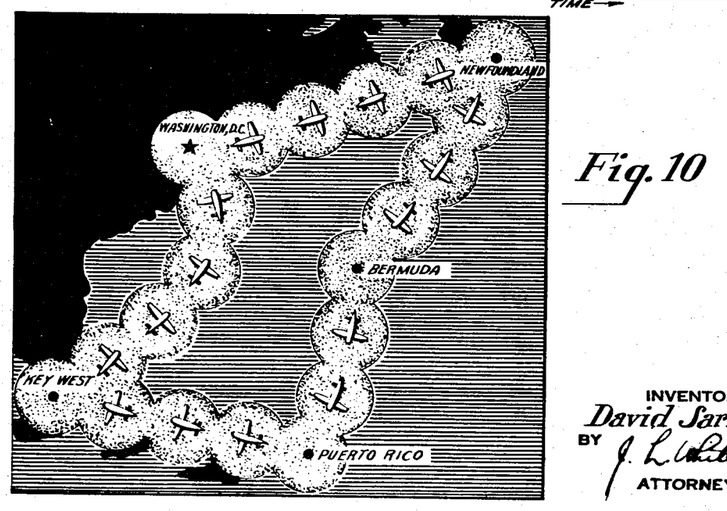
Figure 10 is a diagrammatic view of another one of many possible alternatives in the routing of the line of flight.

Only a few illustrative embodiments of the many possible variations of equipment and operational arrangement are shown in this application. Figure 10 does show one alternative form of path, where the straight-through communication aspect diminishes or vanishes as a closed loop is set up with one side sweeping close to the Atlantic shore and the other side sweeping a band farther out. For the Arctic approaches it might be desirable to establish a roughly circular path whose upper reach serves as an early warning net and whose lower reach serves for transcontinental transportation. In any configuration there are many possibilities for tie-in with outlying early warning tower stations.

Use of parasite planes and fighter aircraft to increase depth of defense

The depth of defense provided by a radar fence may be greatly increased by having each of the early warning radar-equipped planes carry a parasite plane that may be flown toward an enemy target as soon as it is located by the early warning equipment. The parasite plane is equipped with radar control intercept apparatus including a P. P. I. type of radar so that the necessary information as to the target's position and speed is obtained at the parasite plane. The parasite plane carries a pilot and also an operator for the intercept apparatus. The operator transmits the target information, preferably by television as described hereinafter, to the nearest group of fighter aircraft to direct them to the target.

The fighter aircraft that are to cooperate with the parasite planes are located at fighter bases well behind the radar fence of early warning planes. Where the radar fence is between Newfoundland and London as previously described, some of the fighter aircraft might be carrier based. A more probable defense arrangement would be one where the early warning aircraft that form the radar fence would fly along the coast of the United States many miles off shore. A defense plan such as illustrated in Figure 10 and described in connection therewith is such an example. In this example the fighter aircraft bases would be located, in part at least, on land at various points along the United States coast.

As another example, the early warning radar fence might comprise airplanes flying from Newfoundland to the most eastern portion of South America. This would give a defense line for the Panama Canal.

It will be evident that with the defense arrangement employing parasite planes and fighter aircraft located at bases spaced along a line to the rear of the radar fence, the importance of relaying radar information to a terminal of the radar fence is greatly reduced since the radar and other information obtained by an early warning plane will be transmitted directly to the nearest fighter base. However, it still may be desirable to relay the early warning radar information and the like to a terminal or central command station.

In operation, as soon as an early warning plane locates an enemy bomber or other target the parasite plane is released and it travels toward the target, and the nearest aircraft fighter base is informed of the general location of the target. The fighter base may be so informed either by the early warning plane or the parasite plane by means of ordinary radio communication. The fighter planes are dispatched to the general location indicated. Meanwhile, the early warning plane continues on its course without deviation and the parasite plane directs the approaching aircraft fighters by radio communication until they are close enough to receive the television signal from the parasite plane.

With both the parasite plane and the fighter planes approaching the target, the fighter planes finally get close enough to the parasite plane to receive television signals from it; also, the fighter planes are picked up by the parasite plane radar so that now both the target and the fighter plane are shown on the P. P. I. radar screen of the parasite plane. This picture on the radar screen is transmitted by television to the fighter aircraft in the same manner as in a Teleran system. Each fighter plane carries a television receiver so that the transmitted picture appears on a screen of the receiver.

Each fighter plane may carry a radio beacon just as in a Teleran system and suitable means is provided so that each fighter plane pilot can identify the spot in the picture representing his own plane.

In addition to the P. P. I. radar, the parasite plane may carry a radar unit employing vertical lobe switching or some other means to that the parasite plane will be enabled to adjust its altitude until it is at the same altitude as the target. Instead of an additional radar unit, however, it is preferred to provide vertical lobe switching in the P. P. I. radar itself. The altimeter of the parasite plane then indicates the altitude which is immediately relayed to the fighter planes either by speech or by including the altitude figure in the picture being televised.

The picture transmitted from the parasite plane to the fighter plane may illustrate the complete plan of operation and will usually be a composite picture comprising the P. P. I. picture with maps, charts, sketches, the altitude figure, etc. superimposed thereon by means such as employed in Teleran. In this way the operator in the parasite plane may advise each fighter pilot that a certain enemy bomber is his assignment. By the aid of the other information appearing on the screen, the fighter pilot may then proceed toward the bomber and intercept it.

Since the equipment carried by the parasite and fighter planes as described above is well known in the art, it need not be described in detail. The P. P. I. radar may scan 360 degrees in azimuth, or possibly scanning through only 180 degrees will be sufficient to include both the target and the fighter planes in the picture.

Lobe switching is well known. As used on a parasite plane, the antennas are pointed along the horizontal so that the "on target" indication is obtained when the parasite plane is on the same level as the target.

Teleran equipment is well known and is described in considerable detail, for example, in RCA Review, December 1946, pages 601 to 621 and in RCA Review, December 1947, pages 613 to 632. It is also described and claimed in patent application Serial No. 607,999½, filed July 31, 1945, in the name of Loren F. Jones, and entitled Radio Navigation System.

Further details of constituents

It will be understood that the present invention is primarily a system. I have therefore not shown in detail the various previously known elements or constituents which are utilized in building up this system. In order to avoid any question of the completeness of the disclosure, and at the same time avoid an over prolix specification, I have listed below by way of example but not by way of limitation some showing of components of my system, which are hereby incorporated by reference into the disclosure of this application.

Messages modulating subcarrier which modulates carrier—U. S. Patent No. 2,358,382 of September 19, 1944 to W. L. Carlson.

Self-orienting radio direction finder—U. S. Patent No. 2,314,029 of March 16, 1943 to D. S. Bond and W. L. Carlson.

Servo-mechanisms for lock-on following for antennas — "Servo-mechanism Fundamentals," by Lauer, Lesnick and Watson, McGraw Hill Publishing Co., New York, 1947.

Radar elevation determining means—U. S. Patent No. 2,231,929, "Tridimensional Radio Direction Indicator" to J. Lyman.

What is claimed is:

1. Radio relay, control and warning apparatus for each aircraft of a system wherein a plurality of radio-relay carrying aircraft are to relay communication signals from one aircraft to the other, said radio relay and control apparatus comprising a first directive antenna for transmitting signals toward another directive antenna, an automatic direction finder on the same aircraft as that carrying said first directive antenna, said direction finder being for the purpose of pointing toward a non-directional radiating beacon at the same location as said other directive antenna, means for controlling the direction of said first directive antenna by said direction finder to make said first directive antenna point automatically toward said other directive antenna, radar means on the same aircraft as that carrying said first directive antenna for obtaining warning signals indicating the presence of other craft or missiles within the range of said radar means, and means for radiating both said communication signals and said warning signals from said first antenna for reception at said other directive antenna.

2. Radio relay and warning apparatus and antenna directional control apparatus therefor, said relay, warning and control apparatus to be carried by an aircraft to function as one relay and warning station of a chain of relay and warning stations, said radio relay and warning apparatus comprising a radio receiver and a directional receiving antenna therefor and further comprising a radio transmitter and a directional transmitting antenna therefor whereby a communication signal may be picked up by said receiving antenna and retransmitted from said transmitting antenna, and still further comprising a radar system for obtaining warning signals for indicating the presence of other craft or missiles within the range of said radar system, means for supplying said warning signals to said relay transmitter for transmission whereby both said communication signal and said warning signal are radiated from said directional transmitting antenna, said control apparatus comprising a radio beacon transmitter and a non-directional antenna therefor for radiating a radio wave therefrom, said control apparatus further comprising an automatic direction finder and means coupling said finder to said directive receiving antenna to control its direction and further comprising a second automatic direction finder and means coupling said second finder to said directive transmitting antenna to control its direction.

DAVID SARNOFF.

REFERENCES CITED

The following references are of record in the file of this patent:

UNITED STATES PATENTS

| Number | Name | Date |
|---|---|---|
| 1,624,966 | Morris | Apr. 19, 1927 |
| 2,152,329 | Schussler | Mar. 28, 1939 |
| 2,171,293 | Plastino | Aug. 29, 1939 |
| 2,234,244 | Gossel | Mar. 11, 1941 |
| 2,307,029 | Elm | Jan. 5, 1943 |
| 2,401,759 | Hersey | June 11, 1946 |
| 2,421,017 | Deloraine | May 27, 1947 |
| 2,468,045 | Deloraine | Apr. 26, 1949 |
| 2,480,123 | Deloraine | Aug. 30, 1949 |

OTHER REFERENCES

New York Times, page 17, August 10, 1945.
Westinghouse Stratovision (8 pages).